(12) United States Patent
Collins

(10) Patent No.: US 8,858,190 B2
(45) Date of Patent: Oct. 14, 2014

(54) STEAM POWERED PUMP

(75) Inventor: Robert Collins, Schwenksville, PA (US)

(73) Assignee: Watson McDaniel Company, Pottstown, PA (US)

( * ) Notice: Subject to any disclaimer, the term of this patent is extended or adjusted under 35 U.S.C. 154(b) by 915 days.

(21) Appl. No.: 12/930,737

(22) Filed: Jan. 15, 2011

(65) Prior Publication Data

US 2012/0183415 A1   Jul. 19, 2012

(51) Int. Cl.
F04F 1/06 (2006.01)
F04F 3/00 (2006.01)
F04B 49/025 (2006.01)
F16K 31/26 (2006.01)

(52) U.S. Cl.
CPC .............. *F04B 49/025* (2013.01); *F04F 3/00* (2013.01); *F16K 31/26* (2013.01); *F16K 31/265* (2013.01)
USPC ........................................ 417/132; 417/135

(58) Field of Classification Search
CPC .......... F16K 31/26; F16K 31/265; F04F 3/00; F04B 49/025
USPC .......... 417/132, 135; 137/173, 192, 435, 442, 137/445
See application file for complete search history.

(56) References Cited

U.S. PATENT DOCUMENTS

| 302,622 | A | * | 7/1884 | Coffee | 137/192 |
| 2,601,139 | A | * | 6/1952 | Hill | 137/445 |
| 5,141,405 | A | * | 8/1992 | Francart, Jr. | 417/133 |
| 5,366,349 | A | * | 11/1994 | Ilg | 417/132 |
| 5,401,142 | A | * | 3/1995 | Yumoto | 417/132 |
| 6,015,267 | A | * | 1/2000 | Yumoto | 417/54 |
| 6,293,302 | B1 | * | 9/2001 | Waters et al. | 137/390 |
| 6,336,467 | B1 | * | 1/2002 | Schneider | 137/192 |
| 7,703,476 | B1 | * | 4/2010 | Carroll | 137/421 |
| 2003/0155007 | A1 | * | 8/2003 | Hotta et al. | 137/192 |
| 2006/0272705 | A1 | * | 12/2006 | Sugawara | 137/192 |

* cited by examiner

Primary Examiner — Charles Freay
(74) Attorney, Agent, or Firm — Ryder, Lu, Mazzeo & Konieczny LLC

(57) ABSTRACT

Embodiments of the present invention provide a non-electric pump. Gas pressure, typically steam or compressed air, is used to move a liquid, typically steam condensate, from a low pressure source to a high pressure destination. A tank fills with liquid from the source. Once full, the motive pressure is admitted to the tank and the pressure forces the liquid to the destination. When the tank is empty, the motive valve shuts and a vent valve opens to vent off the motive gas. A balanced trap plunger with an unattached float linkage provides for improved pump efficiency.

20 Claims, 7 Drawing Sheets

STEAM POWERED PUMP

FIELD OF THE INVENTION

The present invention relates generally to pumps, and more specifically, to a steam powered pump with improved efficiency.

BACKGROUND

Steam-powered pumps have been used for years in a variety of industrial applications, such as heating and hot water distribution, to name a few. Such systems produce condensate as a byproduct. Condensate generated from latent water vapor must be collected and discarded to avoid damage to the heating/cooling unit and to prevent this contaminant from entering the surrounding environment.

Pumps used in prior art condensate recovery systems collect the condensate in a vessel, and then introduces a high-pressure working fluid—such as steam—into the vessel by operating a change-over valve. The pressure of the high-pressure working fluid discharges the condensate from the inside of the vessel. To insure high-efficiency operation of the pump, it is necessary to collect as much condensate as possible within the vessel and to properly switch the change-over valve. One such prior art pump is disclosed in U.S. Pat. No. 5,655,888 to Yumoto, and is incorporated herein by reference, to the extent not inconsistent with the present disclosure. As efficient pump mechanisms improve the ability to return condensate to the boiler, and improve efficiency of the overall system, it is therefore desirable to have a steam-powered pump with improved efficiency and operating characteristics.

SUMMARY

Embodiments of the present invention provide a non-electric pump. Instead, gas pressure (typically steam or compressed air) is used to move a liquid (typically steam condensate) from a low pressure source to a high pressure destination. The gas pressure, called motive pressure, must be greater than the pressure of the destination. Check valves are used to permit the liquid to only flow from source to destination. Pumps according to embodiments of the present invention are cyclic devices. A tank fills with liquid from the source. Once full, the motive pressure is admitted to the tank and the pressure forces the liquid to the destination. When the tank is empty, the motive valve shuts and a vent valve opens to vent off the motive gas. Once the tank pressure is relieved the liquid from the source can enter—repeating the cycle.

A bi-stable overcenter type of mechanism is used to actuate the motive and vent valves, which have opposite action. These valves need to actuate quickly, essentially "snap acting" to prevent the motive and vent valves from being open (even partially) at the same time. The work done by the float as it rises is stored in springs that act on the overcenter links. As the float forces the links to travel over center, the spring energy forces the links to quickly change position, thereby actuating the valves.

Embodiments of the present invention can also serve as a steam trap. Steam traps are used in steam systems to isolate the steam from the condensate. In a steam heated process, such as an air heater for example, steam will heat the air in some type of heat exchanger. In the process the steam, having released its latent heat, will condense to a liquid. This condensate must be drained out of the heat exchanger to make room for more steam to enter. A steam trap is a type of valve that opens to allow the condensate to pass through, but it closes once steam enters the trap, as it is efficient to preserve steam in the heat exchanger to provide heat to the external source. Steam traps come in many shapes and sizes and they use one of several different physical principles to open to liquids but close to gases. A typical type of trap in the air heating process above would use float connected to a valve (similar to a toilet tank valve). Liquid entering the valve causes the float to rise and open the valve. Once the liquid drained away, gravity causes the float to lower thus closing the valve. This float trap mechanism is included in embodiments of the present invention.

A typical valve has a plunger that fits into a seat. The force required to open the valve is calculated by multiplying the seat area by the pressure difference between the inlet and outlet. This force increases linearly as the pressure differential increases. The force increases as the square of the seat diameter. The flow capacity of the valve also increases as the square of the seat diameter. It is desirable with a valve to maximize both flow capacity and maximum operating differential pressure. However, with the aforementioned valve type, there is a tradeoff, and either the maximum operating differential pressure or the flow capacity will be constrained.

Embodiments of the present invention overcome this problem by utilizing a balanced valve. The valve seat has two sealing faces that close simultaneously. Preferably, the diameter of the faces is very closely controlled, with one diameter being slightly larger than the other, in one embodiment having a 0.015 inch to 0.030 inch difference. The inlet pressure acts simultaneously on both the upper and lower surfaces of the valve plunger. The net force is greatly reduced since it is controlled by the difference in area of the two seating diameters. This seat design can provide 3 to 4 times the flow area of a typical pump/trap seat. Furthermore, the balanced valve is biased in the open position by a spring, and the linkage that closes the valve is not mechanically connected to the valve, but is instead unattached. The combination of the bias spring, and the unattached linkage provide for improved efficiency, since as the linkage rises, it does not have to overcome the force required to open the valve. By combining a vapor powered pump packaged with a steam trap that utilizes a balanced design, embodiments of the present invention provide the advantage of a higher pumping capacity for a given pump size.

BRIEF DESCRIPTION OF THE DRAWINGS

In the drawings accompanying the description that follows, often both reference numerals and legends (labels, text descriptions) may be used to identify elements. If legends are provided, they are intended merely as an aid to the reader, and should not in any way be interpreted as limiting.

DETAILED DESCRIPTION

Figure 1:
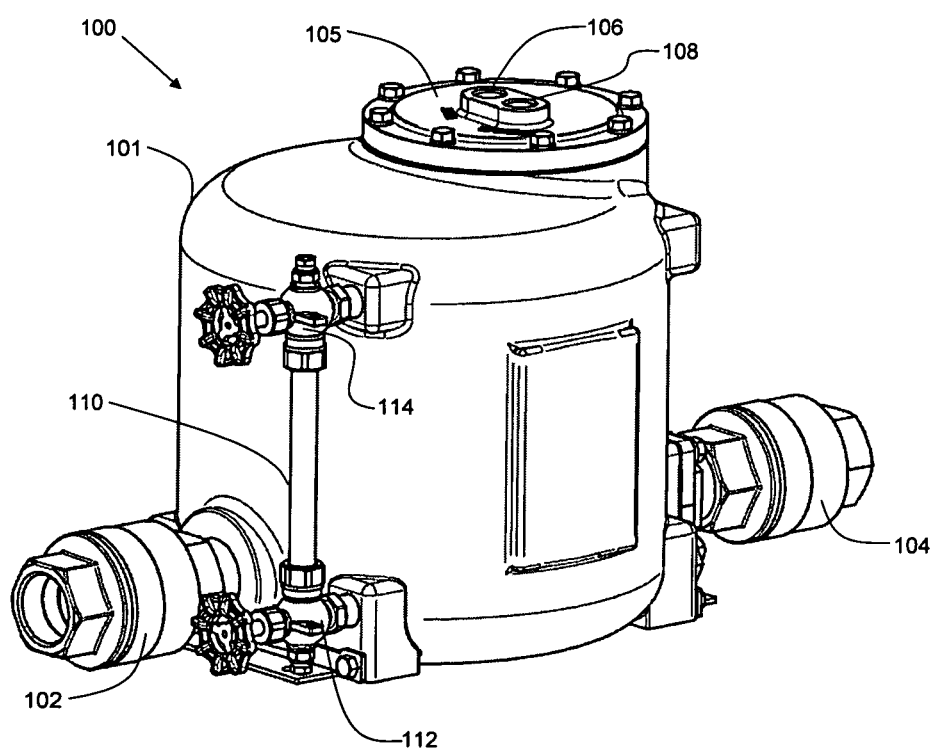
FIG. 1 is an outside isometric view of an embodiment of the present invention.

FIG. 1 is an outside isometric view of an embodiment of a pump 100 in accordance with the present invention. As will be explained, pump 100 has two modes of operation: In one mode, it operates as a steam trap, and in another mode, it operates as a pump. For the purposes of this disclosure, reference 100 is referred to as a "pump," even though it can also provide the mode of operation as a trap. Pump 100 is comprised of tank 101 that holds liquid and/or steam. Liquid enters the pump via input check valve 102. The input check valve 102 allows liquid to flow only in one direction (unidirectionally), which is into the tank. Input check valve 102 prevents liquid from exiting the tank. During the pumping operation, liquid is output via output check valve 104. Output check valve 104 is unidirectional, and only allows liquid to exit the tank, and does not allow liquid to enter the tank. Optionally, a sight glass 110 is used to allow visual verification of pump operation. When the pump is operating normally, an operator can observe a changing liquid level in the sight glass. Sight glass shutoff valves 112 and 114 allow for servicing and replacement of the sight glass during maintenance of the pump 100. Cover 105 houses motive valve inlet 106 and vent valve outlet 108, which provide entry and exit for the steam that powers pump 100.

Figure 2:
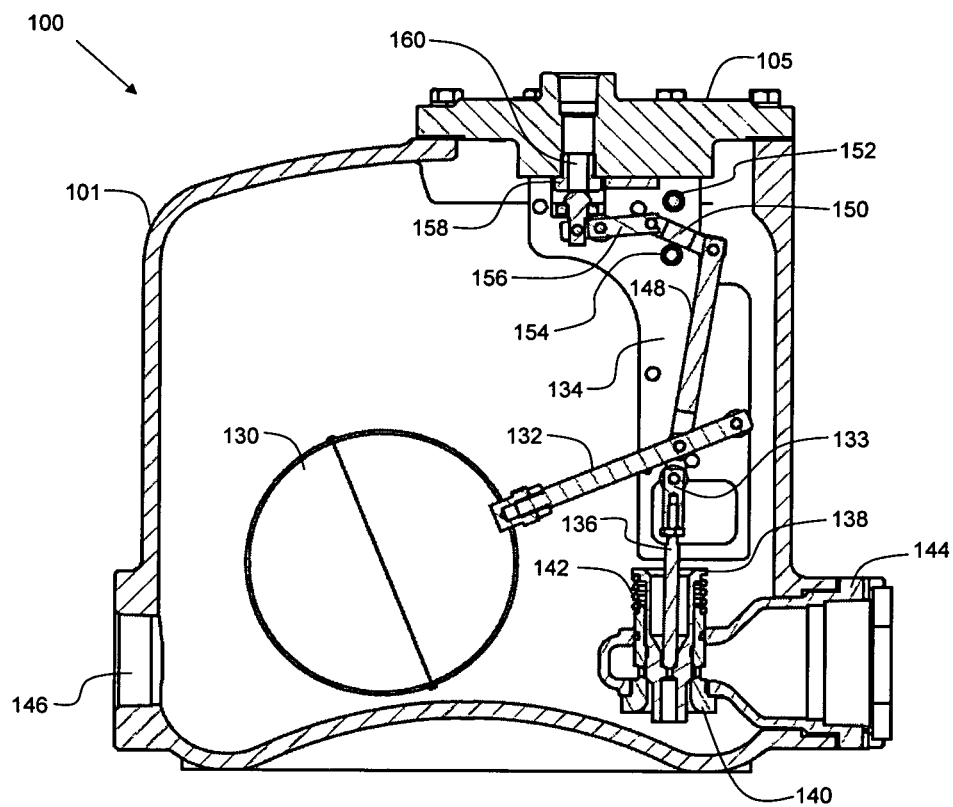
FIG. 2 is a cross-sectional view of an embodiment of the present invention with the float in the low position.

FIG. 2 is a cross-sectional view of pump 100 with the float 130 in the low position. In one embodiment, float 130 is comprised of metal, such as aluminum, and may be hollow, or filled with a buoyant material such as foam. The float 130 is connected to float arm 132. Float arm 132 is connected to operating rod 148, which is mechanically linked to trap plunger rod 136 via adjustment fitting 133. The adjustment fitting 133 allows the travel limits of the plunger rod 136 to be adjusted via threads on the adjustment fitting 133. The float is in the low position when the level of liquid in tank 100 is low enough to allow the float to fall to its minimum height. This causes the trap plunger rod 136 to push the trap plunger 138 into the trap valve seat 140, thereby preventing any liquid or steam from escaping out of the trap body 144. Trap body 144 therefore serves as a liquid discharge port when the pump 100 is in operation. There is a gasket sealing the pump mechanism cover (105) to the tank (101) and another gasket sealing the trap body (144) to the tank (101). The float arm 132 and valve actuation linkages are attached to pump frame 134. Pump frame 134 is secured to cover 105. The valve actuation linkage comprises operating rod 148, link 150, and pivot arm 156, as well as valve actuator weldment 158. Therefore, operating rod 148 controls the operation of motive and vent valves that are present in cover 105. Operating rod 148 is connected to link 150. Upper trip pin 152 and lower trip pin 154 establish travel limits for link 150. Link 150 is attached to pivot arm 156. As liquid enters the tank 101 via liquid inlet port 146 the float 130 will rise, and as it nears the top of its travel, the valves in the cover 105 will be actuated. There are two valves in the cover, a motive valve (not shown in this view) and a vent valve 160. Both valves are actuated via the valve actuator weldment 158.

Figure 3:
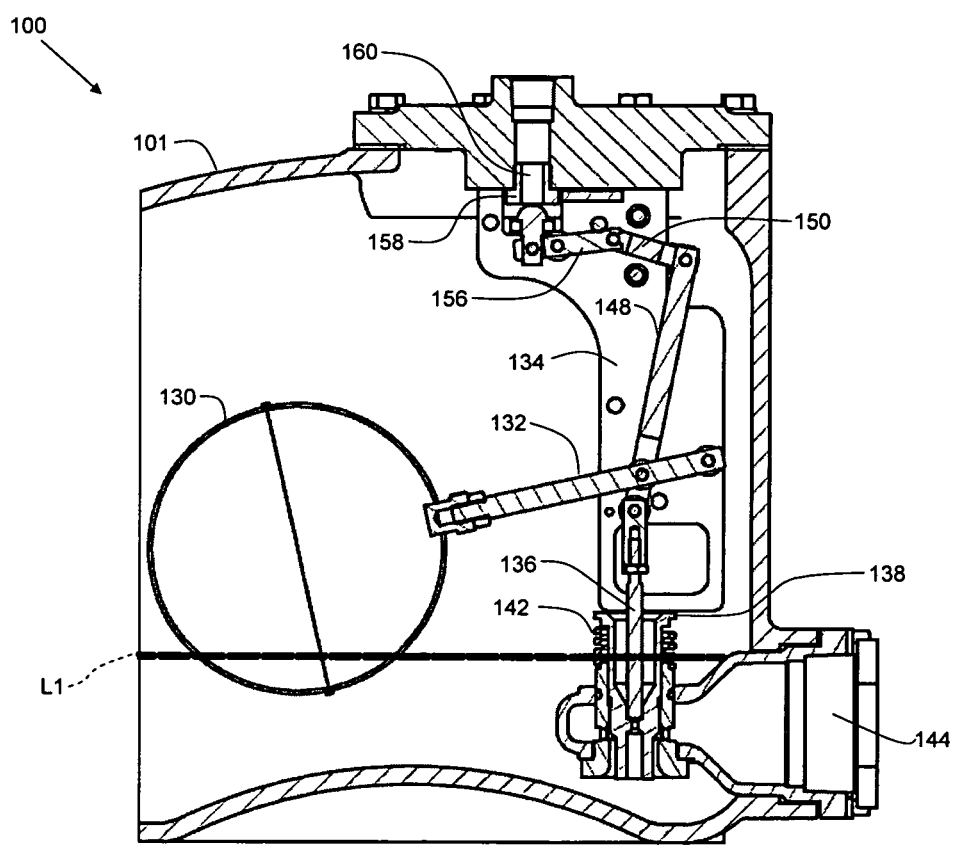
FIG. 3 is a cross-sectional view of an embodiment of the present invention with the float in a middle position.

FIG. 3 is a cross-sectional view of pump 100 of the present invention with the float in a middle position. The liquid being pumped (typically water) is at level L1, which causes float 130 to raise as compared with the low position indicated in FIG. 2. As the float is elevated, plunger rod 136 travels upward, spring 142 forces plunger 138 upward, thereby allowing liquid to exit the tank 101 via trap body 144. Link 150 and pivot arm 156 position valve actuator weldment 158 such that vent valve 160 is opened, so that gas can escape from the tank 101 to make room for incoming liquid.

Figure 4:
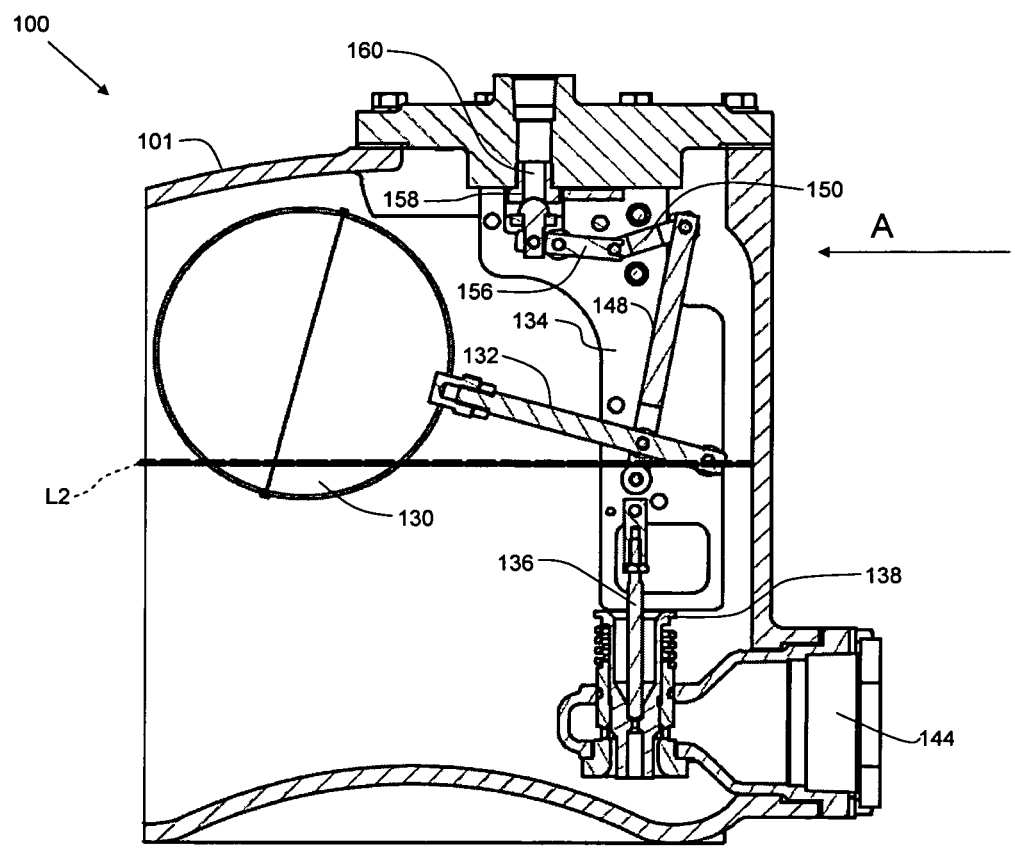
FIG. 4 is a cross-sectional view of an embodiment of the present invention with the float in the high position.

FIG. 4 is a cross-sectional view of pump 100 with the float 130 in the high position. The liquid, having risen to level L2 causes operating arm 148 to move link 150 and pivot arm 156 such that valve actuator weldment 158 simultaneously closes vent valve 160, and opens the motive valve (not shown in this FIG., refer to FIG. 5). Once the motive valve opens, high-pressure steam enters tank 100 and as plunger 138 is in a raised position, liquid is forced out of trap body 144. In one embodiment, plunger rod 136 is not mechanically attached to plunger 138. Pump frame 134 serves as a travel limit for plunger 138. In this way, as float 130 approaches its upper travel limit, it is not affected by the weight of the plunger 138. In the high position, plunger rod 136 moves independently of plunger 138. By reducing the amount of force the float must overcome in order to raise, pump efficiency is improved.

As the high-pressure steam enters the tank 101 via the opened motive valve, the liquid is expelled via trap body 144, and the float lowers until it reaches the low position (shown in FIG. 2). When the tank 101 is sufficiently empty such that the float 130 is in the low position, the motive valve closes simultaneously as the vent valve 160 opens, and the plunger 138 is pushed into the closed position, preventing liquid from escaping via trap body 144. This cycle then repeats, and the pumping operation continues.

Figure 5:
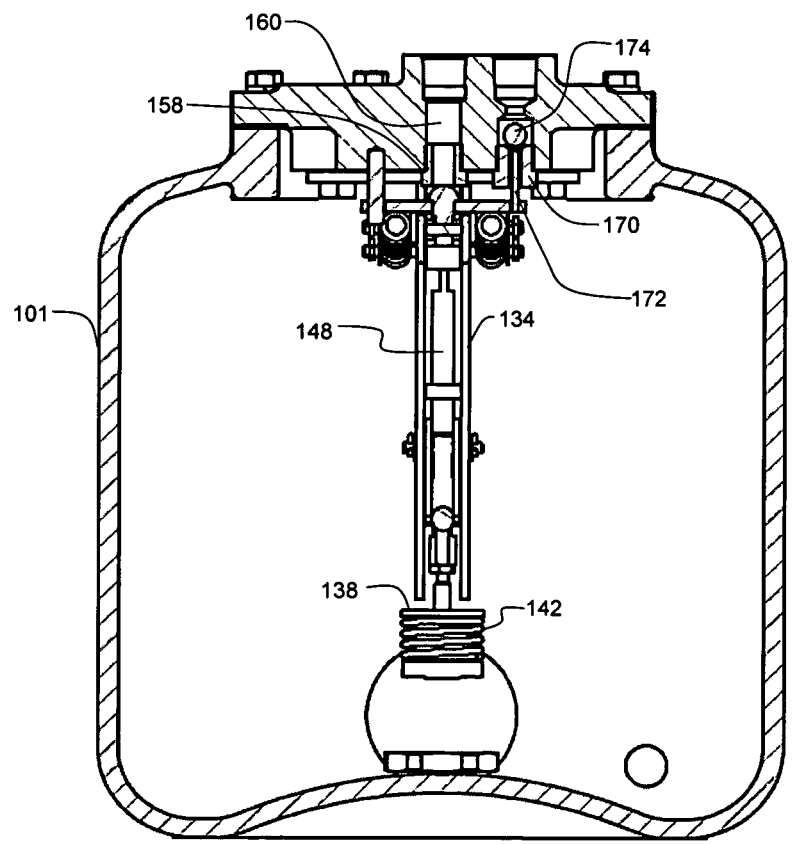
FIG. 5 is a side cross-sectional view illustrating the motive and vent valve linkages.

FIG. 5 is a side cross-sectional view (as viewed from direction A in FIG. 4) illustrating the motive and vent valve linkages. In this view, motive valve 170 and vent valve 160 are visible. Valve actuator weldment 158 is configured to open one valve, and simultaneously close the other valve, depending on the position of the float (see FIGS. 2-4). When the valve actuator weldment 158 is in its lowest position, vent valve 160 is opened, and motive valve 170 is closed. As valve actuator weldment approaches its highest position, motive valve plunger 172 travels upward, and pushes ball 174, which allows steam to enter the tank 101. Simultaneously, valve actuator closes vent valve 160. This causes pressure to build in the tank, which expels liquid from the tank via trap body 144. As the float lowers, motive valve 170 closes. Since the tank is still pressurized from the steam, liquid continues to be expelled from trap body 144 until the float reaches the low position. At that point, valve actuator weldment 158 will be low enough to allow vent valve 160 to open, and plunger 138 seals the trap body 144. This allows the tank to fill, and the cycle repeats.

The following table summarizes the state of the trap plunger 138 based on the various float positions during the filling of the tank.

| FLOAT POSITION | TRAP |
| --- | --- |
| LOW | CLOSED |
| MIDDLE | OPENED |
| HIGH | OPENED |

The following table summarizes the state of the valves based on the direction of the float. When the float is rising, the apparatus is in a filling mode, and the motive valve is closed and the vent valve is opened. When the float is falling, the apparatus is in a pumping mode, and the motive valve is opened and the vent valve is closed.

| FLOAT DIRECTION | MOTIVE VALVE | VENT VALVE |
| --- | --- | --- |
| RISING | CLOSED | OPENED |
| FALLING | OPENED | CLOSED |

Figure 6:
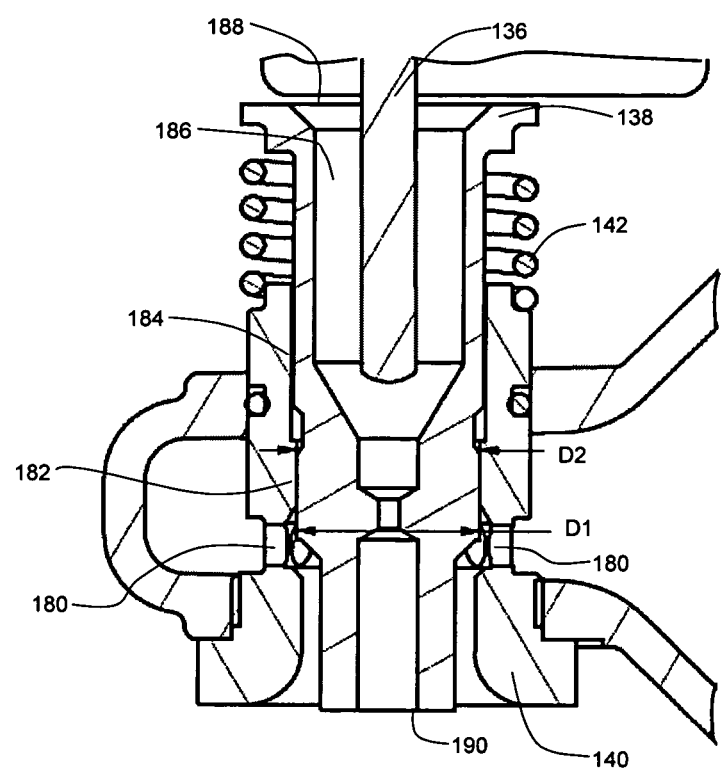
FIG. 6 is a detailed view of the steam trap valve.

FIG. 6 is a detailed view of the steam trap valve. Plunger 138 has rod receptacle 186, which is a hollowed area for receiving and guiding the plunger. In one embodiment, plunger rod 136 is unattached (not physically connected with a fastener) to plunger 138, and is disposed within rod receptacle 186. Spring 142 biases the plunger 138 into an open position, such that when the float rises, which in turn causes plunger rod 136 to raise, the spring 142 causes plunger 138 to move upward, which opens the trap valve, allowing liquid to flow through radial passages 180, and exit the apparatus via trap body (144 of FIG. 2).

The plunger 138 is disposed with valve seat 140. In this detailed view, it can be seen that the plunger 138 is comprised of a first portion and a second portion. The first portion has a diameter D1 and the second portion has a diameter D2. In this case, diameter D2 is slightly larger than diameter D1. This causes two separate sealing edges, first sealing edge 182, and second sealing edge 184 that form between the plunger 138 and the valve seat 140. The inlet pressure acts simultaneously on both the upper surface 188 and lower surface 190 of the plunger 138. The net force is greatly reduced since it is controlled by the difference in area of the two seating diameters, D1 and D2. This allows a fairly large seat diameter, providing the advantage of higher throughput, without the typical disadvantage of the increased force required to operate the plunger, which can reduce pump efficiency.

Figure 7:
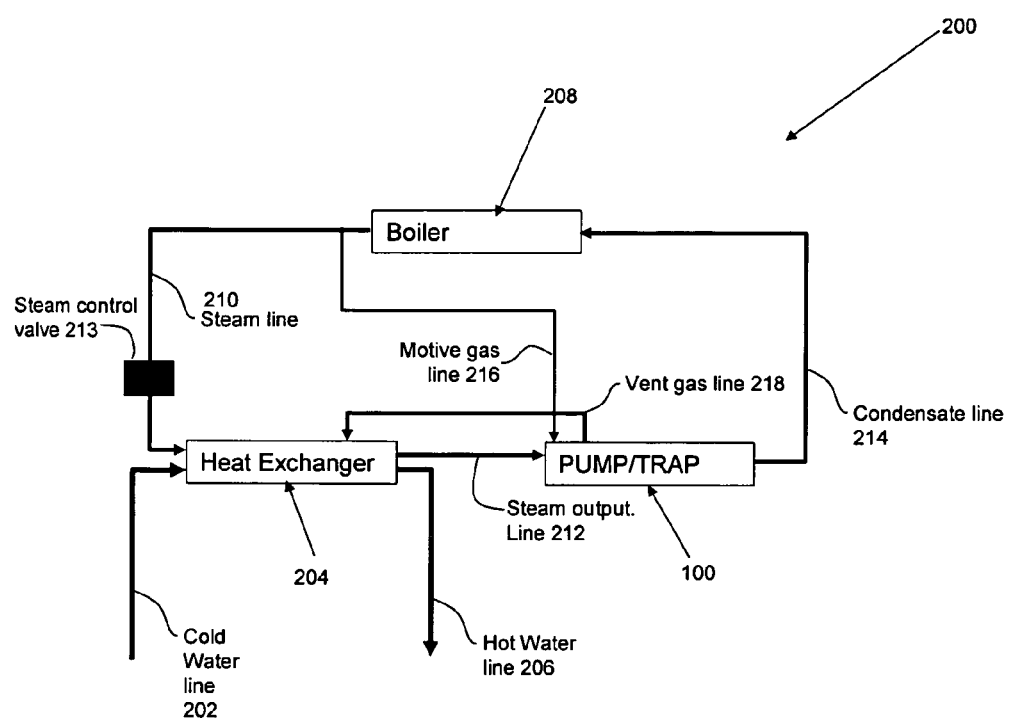
FIG. 7 is a block diagram of an example usage of an embodiment of the present invention.

FIG. 7 is a block diagram of an example usage of an embodiment of the present invention. A hot water heating system 200 is shown, which comprises pump 100 of an embodiment of the present invention. Boiler 208 provides steam to heat exchanger 204 via steam line 210. Cold water line 202 supplies cold water to heat exchanger 204. As a result of heat exchange, hot water exits the heat exchanger 204 via hot water line 206. The steam exits heat exchanger via steam output line 212. Since the temperature drops as a result of the heat exchange, there is a mixture of steam and condensate in the steam output line 212. The steam output line is connected to the input valve (102 of FIG. 1) of the pump. As condensate fills the pump 100, it is pumped out via condensate line 214, which is connected to the output (104 of FIG. 1) of pump 100, and returns the condensate to boiler 208. Motive gas line 216 provides power to the pump, and vent gas line 218 allows steam to be returned, thereby keeping the steam in a closed system.

The pump 100 automatically switches between trap mode and pump mode depending on the operation conditions of system 200. For example, when the demand for hot water is high, the steam control valve 213 is opened sufficiently to provide enough pressure such that pumping may not be necessary. In this case, pump 100 operates as a steam trap. The float then moves only between the low and middle positions (see. FIG. 2 and FIG. 3). When moving to the middle position, the trap plunger 138 opens, and condensate will exit via trap body 144, so long as pressure within tank 101 is sufficient to do so. The steam trap within the pump 100 prevents steam from entering the condensate line 214. However, as there is sufficient pressure to force liquid from the pump 100, the motive gas is not supplying force to the pump 100, since the float never reaches the high position (FIG. 4).

Once hot water demand drops to a low level, steam control valve 213 is partially closed, which results in a drop in steam pressure. Now, the pressure is no longer sufficient to move the condensate back to the boiler. In this case, the tank within pump 100 starts to fill with condensate, until the float reaches the high position (see FIG. 4), and the motive valve of the pump opens, and gas from the motive gas line allows the pumping operation to begin. Therefore, pump 100 switches between trap mode and pump mode automatically, without the need for user intervention.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:
1. A pump comprising:
a tank having a liquid inlet port and a liquid discharge port;
a tank cover having a motive valve inlet and a vent valve outlet;
a motive valve for opening and closing said motive valve inlet;
a vent valve for opening and closing said vent valve outlet;
a valve actuation linkage connected to said motive valve and said vent valve;
a float;
a float arm coupled to said float;
a pump frame mounted to the tank cover within an interior of the tank, wherein the float arm is pivotally mounted to the pump frame, and mechanically attached to the valve actuation linkage;
a plunger rod mechanically coupled to the float arm;
a plunger configured and disposed to control the flow of liquid exiting the tank via the liquid discharge port, wherein the plunger includes a rod receptacle configured and disposed to receive and guide a distal end of the plunger rod therewithin, and wherein the plunger rod is unattached to the plunger and forms a lost motion device therewith; and
a spring configured and disposed to bias the plunger in an opened position.

2. The pump of claim 1, wherein the pump frame is configured and disposed to serve as a travel stop, thereby limiting travel of the plunger.

3. The pump of claim 1, wherein the float is comprised of metal.

4. The pump of claim 1, wherein the valve actuation linkage comprises:
a trap adjustment fitting to provide a mechanical coupling between the plunger rod and the float arm;
an operating rod hingedly connected to the float arm at an intermediate point of the operating rod;
a link rod hingedly connected to an end of the operating rod; and
a valve actuation mechanism to control operation of the vent valve and the motive valve based on travel direction of the float arm.

5. The pump of claim 4, wherein the valve actuation mechanism comprises:
a pivot arm comprising a first end and a second end, wherein the first end of the pivot arm is hingedly connected to the link rod; and a valve actuator weldment hingedly connected to the second end of the pivot arm, wherein the valve actuator weldment is configured and disposed to actuate the vent valve and the motive valve.

6. The pump of claim 1, wherein the plunger is comprised of a first portion and a second portion, and wherein the first portion has a first diameter and the second portion has a second diameter, and wherein the second diameter is slightly larger than the first diameter.

7. The pump of claim 1, further comprising a sight glass.

8. The pump of claim 7, further comprising a plurality of sight glass shutoff valves.

9. The pump of claim 1, wherein the valve actuation linkage is configured and disposed such that the plunger and vent valve are opened when the float arm is in an intermediate position and rising.

10. The pump of claim 1, wherein the valve actuation linkage is configured and disposed such that the plunger and motive valve are opened when the float arm is in an intermediate position and falling.

11. The pump of claim 1, wherein the valve actuation linkage is configured and disposed such that the plunger is closed when the float arm is in a low position.

12. The pump of claim 6, wherein the difference between the first diameter and the second diameter ranges from about 0.015 inches to about 0.030 inches.

13. The pump of claim 1, further comprising an input check valve to allow liquid to flow into the tank via the liquid inlet port unidirectionally.

14. The pump of claim 13, further comprising an output check to allow liquid to exit the tank via the liquid discharge port unidirectionally.

15. A pump comprising:
a tank having a liquid inlet port and a liquid discharge port;
a tank cover having a motive valve inlet and a vent valve outlet;
a motive valve for opening and closing the motive valve inlet;
a vent valve for opening and closing the vent valve outlet;
a pump frame mounted to the tank cover within an interior of the tank;
a float;
a float arm coupled to the float and pivotally mounted to the pump frame;
a plunger rod mechanically coupled to the float arm;
a plunger configured and disposed to control the flow of liquid exiting the tank via the liquid discharge port, wherein the plunger includes a rod receptacle configured and disposed to receive a distal end of the plunger rod therewithin, and wherein the plunger rod is unattached to the plunger;
a spring configured and disposed to bias the plunger in an opened position;
an operating rod hingedly connected to the float arm;
a link rod hingedly connected to the operating rod;
a pivot arm hingedly connected to the link rod; and
a valve actuator weldment hingedly connected to the pivot arm and connected to said motive valve and said vent valve, wherein the valve actuator weldment is configured and disposed to actuate the vent valve and the motive valve based on travel direction of the float arm.

16. The pump of claim 15, wherein the plunger and the plunger rod are configured and disposed to:
open the plunger and allow liquid to exit the tank via the liquid discharge port when the float arm is in either an intermediate or high position; and
close the plunger and block liquid from exiting the tank via the liquid discharge port when the float arm is in a low position.

17. The pump of claim 15, wherein the operating rod, the link rod, the pivot arm and the valve actuator weldment are configured and disposed such that the motive valve is open and the vent valve is closed when the float arm is falling.

18. The pump of claim 15, wherein the operating rod, the link rod, the pivot arm and the valve actuator weldment are configured and disposed such that the motive valve is closed and the vent valve is open when the float arm is rising.

19. A pump comprising:
a tank having a liquid inlet port and a liquid discharge port;
a tank cover having a motive valve inlet and a vent valve outlet;
a motive valve for opening and closing the motive valve inlet;
a vent valve for opening and closing the vent valve outlet;
a valve actuation linkage connected to the motive valve and the vent valve;
a pump frame mounted to the tank cover within an interior of the tank;
a float;
a float arm coupled to the float, pivotally mounted to the pump frame and mechanically connected to the valve actuation linkage, wherein ;
a plunger rod mechanically coupled to the float arm;
a plunger configured and disposed to control the flow of liquid exiting the tank via the liquid discharge port, wherein the plunger includes a rod receptacle configured and disposed to receive a distal end of the plunger rod therewithin, wherein the plunger rod is unattached to the plunger, and wherein the pump frame is configured and disposed to serve as a travel stop, thereby limiting travel of the plunger; and
a spring configured and disposed to bias the plunger in an opened position.

20. The pump of claim 19, wherein the valve actuation linkage comprises:
an operating rod hingedly connected to the float arm;
a link rod hingedly connected to the operating rod;
a pivot arm hingedly connected to the link rod; and
a valve actuator weldment hingedly connected to the pivot arm and connected to the motive valve and the vent valve, wherein the valve actuator weldment is configured and disposed to actuate the vent valve and the motive valve based on travel direction of the float arm.

* * * * *